(12) United States Patent
Nakao (10) Patent No.: US 10,131,199 B2
(45) Date of Patent: Nov. 20, 2018

(54) AIR PASSAGE OPENING/CLOSING DEVICE

(71) Applicant: DENSO CORPORATION, Kariya, Aichi-pref. (JP)

(72) Inventor: Yuuichi Nakao, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 388 days.

(21) Appl. No.: 14/390,671

(22) PCT Filed: Apr. 1, 2013

(86) PCT No.: PCT/JP2013/002235
§ 371 (c)(1),
(2) Date: Oct. 3, 2014

(87) PCT Pub. No.: WO2013/150767
PCT Pub. Date: Oct. 10, 2013

(65) Prior Publication Data
US 2015/0118948 A1    Apr. 30, 2015

(30) Foreign Application Priority Data

Apr. 6, 2012 (JP) ................ 2012-087656

(51) Int. Cl.
*B60H 1/34* (2006.01)
*B60H 1/00* (2006.01)

(52) U.S. Cl.
CPC ............... *B60H 1/00692* (2013.01); *B60H 2001/00707* (2013.01)

(58) Field of Classification Search
CPC ............... B60H 1/00692; B60H 2001/00707
See application file for complete search history.

(56) References Cited

U.S. PATENT DOCUMENTS 6,450,246 B1 * 9/2002 Kurokawa ......... B60H 1/00692
454/141
6,508,703 B1    1/2003 Uemura et al.
(Continued)

FOREIGN PATENT DOCUMENTS

DE      60304396 T2    2/2007
JP      2002079819 A   3/2002
(Continued)

OTHER PUBLICATIONS

Office Action dated Nov. 23, 2015 in corresponding Chinese Application No. 201380017360.6 with translation.
(Continued)

*Primary Examiner* — Kenneth Rinehart
*Assistant Examiner* — Phillip E Decker
(74) *Attorney, Agent, or Firm* — Harness, Dickey & Pierce, P.L.C.

(57) ABSTRACT

A guide groove is provided on both sides in a door width direction of a plate-like portion of a door. A radius of curvature of the plate-like portion in a single non-mounted state is set more than that of the guide groove, to thereby support both end portions in the door width direction of the plate-like portion respectively at three abutment points P1 to P3. A rib is provided in the plate-like portion to extend from one end portion in the door width direction of the plate-like portion to the other end portion thereof, so that force generated from both end portions in the door width direction of the plate-like portion is transferred to a center portion in the door width direction of the plate-like portion via the rib. Therefore, it can prevent the center portion and vicinity of the plate-like portion from being deformed in the direction away from a seal surface of the air conditioning case.

11 Claims, 6 Drawing Sheets

(56) References Cited

U.S. PATENT DOCUMENTS

| | | | |
|---|---|---|---|
| 6,688,964 B2* | 2/2004 | Uemura | B60H 1/00692 454/121 |
| 6,814,138 B2* | 11/2004 | Tsurushima | B60H 1/00692 454/160 |
| 7,794,314 B2* | 9/2010 | Sekiya | B60H 1/00692 454/156 |
| 9,381,788 B2* | 7/2016 | Han | B60H 1/00692 |
| 9,434,234 B2* | 9/2016 | Suzuki | B60H 1/00692 |
| 2003/0233843 A1 | 12/2003 | Ueda | |
| 2006/0144582 A1 | 7/2006 | Sekiya et al. | |
| 2009/0197517 A1* | 8/2009 | Wang | B60H 1/00692 454/145 |
| 2009/0313899 A1 | 12/2009 | Tokunaga et al. | |
| 2012/0180393 A1* | 7/2012 | Suzuki | B60H 1/00692 49/348 |
| 2012/0208444 A1* | 8/2012 | Han | B60H 1/00692 454/141 |
| 2013/0260663 A1* | 10/2013 | Kaiyama | B60H 1/00692 454/155 |
| 2015/0038067 A1* | 2/2015 | Byon | B60H 1/00021 454/160 |
| 2016/0001630 A1* | 1/2016 | Nakao | B60H 1/00692 165/42 |
| 2016/0263963 A1* | 9/2016 | Sato | B60H 1/00692 |

FOREIGN PATENT DOCUMENTS

| | | | |
|---|---|---|---|
| JP | 2004-203310 | 7/2004 | |
| JP | 2004216929 A | 8/2004 | |
| JP | 2010036778 A | 2/2010 | |
| JP | 4596046 B2 | 12/2010 | |
| JP | 2013216189 A * | 10/2013 | B60H 1/00692 |
| WO | WO-2004108449 A1 | 12/2004 | |

OTHER PUBLICATIONS

Office action dated Jun. 16, 2015 in corresponding Japanese Application No. 2012-087656.

International Search Report and Written Opinion (in Japanese with English Translation) for PCT/JP2013/002235, dated Jun. 18, 2013; ISA/JP.

Office action dated Jun. 23, 2015 in corresponding Korean Application No. 10-2014-7028550.

Office Action dated Feb. 2, 2016 in corresponding Japanese Application No. 2012-87656 with translation.

* cited by examiner

AIR PASSAGE OPENING/CLOSING DEVICE

CROSS REFERENCE TO RELATED APPLICATIONS

This application is a U.S. National Phase Application under 35 U.S.C. 371 of International Application No. PCT/JP2013/002235 filed on Apr. 1, 2013 and published in Japanese as WO 2013/150767 A1 on Oct. 10, 2013. This application is based on and claims the benefit of priority from Japanese Patent Application 2012-087656 filed on Apr. 6, 2012. The entire disclosures of all of the above applications are incorporated herein by reference.

FIELD OF THE INVENTION

The present disclosure relates to an air passage opening/closing device for opening or closing an air passage by using a slide door. The air passage opening/closing device is suitable for use in an air conditioner for a vehicle.

BACKGROUND ART

A conventional air passage opening/closing device is provided with a guide groove in a case that forms an air passage. The guide groove serves to guide both end portions in the door width direction of a slide door. With this arrangement, the slide door is designed to reciprocate along the guide groove. Such a movement of the slide door opens and closes the air passage of the case.

The radius of curvature of the slide door in a single non-mounted state is set equal to or more than that of the guide groove, so that both end portions of the slide door in the door movement direction are easily brought into contact with a seal surface on a case side when assembling the slide door in the case. Thus, even under a small volume of air, the slide door is pressure-contacted with the seal surface on the case side by pressure of blown air, so as to exhibit good sealability with the slide door.

However, while the air pressure is not applied to the slide door, the slide door is not pressure-contacted with the seal surface on the case side. When the entire case vibrates in this state, both end portions in the door movement direction of the slide door might vibrate, causing abnormal sound (noise) from the slide door.

An air passage opening/closing device disclosed in Patent Document 1 is provided with a guide groove composed of a windward sidewall portion and a leeward sidewall portion. The sidewall portions are respectively provided on both sides of the slide door in the door width direction. The radius of curvature of the slide door in a single non-mounted state is set equal to or more than that of each of the windward sidewall portion and the leeward sidewall portion. As a result, the center portion of the slide door in the door movement direction is pushed against the windward sidewall portion by an elastic deformation force of the door, while both end portions of the slide door in the door movement direction are pushed against the leeward sidewall by the elastic deformation force of the door. In this way, the slide door is supported at three points, including the center portion and both the end portions of the door in the door movement direction, thereby suppressing the vibration of both end portions of the slide door in the door movement direction.

RELATED ART DOCUMENT

Patent Document

[Patent Document 1]: JP Patent No. 4596046

SUMMARY OF INVENTION

However, the inventors of the present application have found through their studies that when an aspect ratio of the slide door (=dimension in the door movement direction of the slide door/dimension in the door width direction of the slide door) is approximately ½ (one half) or less, the slide door generates abnormal sounds (noise).

Figure 8:
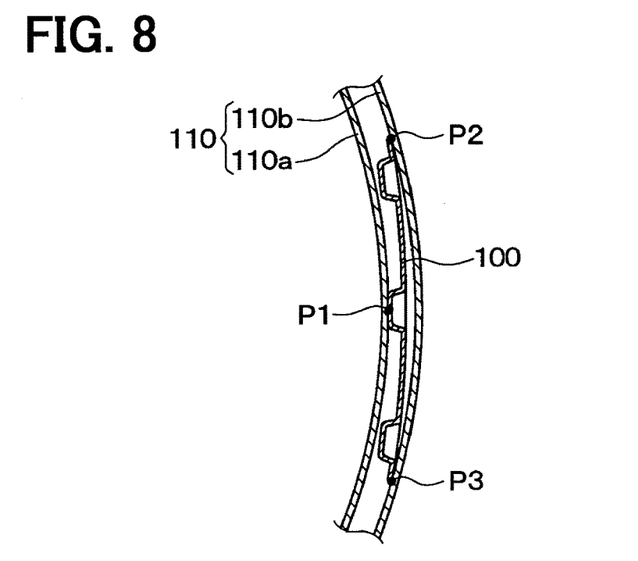
FIG. 8 is a cross-sectional view of end portions in a door width direction of a slide door in a comparative example.

That is, as shown in FIG. 8, when assembling a slide door 100 in a guide groove 110, the slide door 100 has both end portions thereof in the width direction supported in the following manner. A center portion of the slide door 100 in the door movement direction is abutted against a windward sidewall portion 110a of the guide groove 110 at an abutment point P1, while both end portions of the slide door 100 in the door movement direction are abutted against a leeward sidewall portion 110b of the guide groove 110 at abutment points P2 and P3. In this way, the slide door 100 is elastically bent and deformed to be supported at three points, namely, the abutment points P1 to P3.

Figure 9:
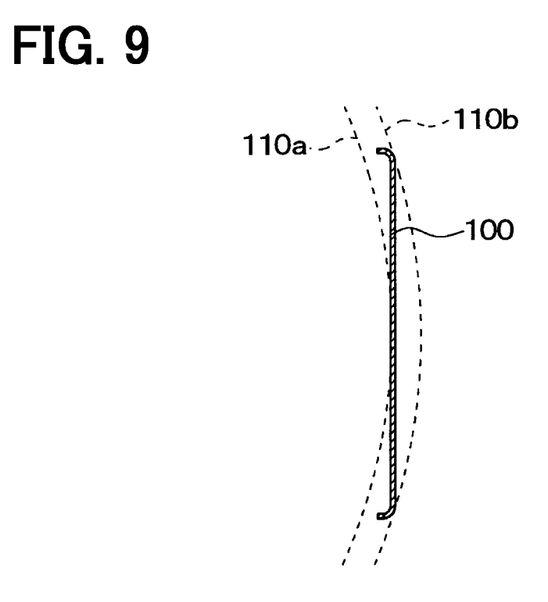
FIG. 9 is a cross-sectional view of a center portion in a door width direction of a slide door in another comparative example.

On the other hand, as the aspect ratio of the slide door 100 is decreased, the elastic deformation force generated at both end portions in the door movement direction is less likely to be transferred toward the center portion in the door width direction of the slide door 100. In this case, as shown in FIG. 9, the center portion in the door width direction of the slide door 100 gets closer to the shape (that is, a substantially flat plate) in the single non-mounted state. The center portion in the door width direction of the slide door 100 located near the center portion in the door movement direction of the door (that is, the center and vicinity of the slide door 100) is positioned on the windward side with respect to even both end portions thereof in the door width direction, and thereby it causes the center and vicinity of the slide door 100 to float from the seal surface on the case side. As a result, both end portions in the door width direction of the slide door 100 supported at three points serve as a node, while the center and vicinity of the slide door 100 floating from the seal surface on the case side serve as a main central part, causing the slide door 100 to vibrate to generate abnormal sound (noise).

As measures against this problem, a packing is added to press the slide door 100 against the seal surface on the case side, so that the slide door 100 is pressure-contacted with the seal surface on the case side even while the air pressure is not applied to the slide door 100. Such measures, however, use the packing as a different part, leading to an increase in cost.

The present disclosure has been made in view of the foregoing matters, and it is an object of the present disclosure to provide an air passage opening/closing device that can suppress vibration of a center portion in the door width direction of the slide door without increasing the number of parts of the device.

According to one exemplary embodiment of the present disclosure, an air passage opening/closing device includes a case forming an air passage, a slide door including a plate-like portion slidably disposed in the case and being adapted to open and close the air passage by the plate-like portion, and a guide groove. The guide groove includes a windward sidewall portion formed in the case to extend in a door movement direction on a windward side with respect to the plate-like portion, and a leeward sidewall portion formed in the case to be opposed to the windward sidewall portion on a leeward side with respect to the plate-like portion, and the guide groove guides a movement of the plate-like portion by the windward sidewall portion and the leeward sidewall portion. The guide groove is disposed at both sides of the plate-like portion in a door width direction, and a radius of curvature of the plate-like portion in a single non-mounted state is set more than a radius of curvature of each of the windward sidewall portion and the leeward sidewall portion, In addition, a center portion in the door movement direction of the plate-like portion is abutted against one of the windward sidewall portion and the leeward sidewall portion, and an end portion in the door movement direction of the plate-like portion is abutted against the other one of the windward sidewall portion and the leeward sidewall portion, such that the plate-like portion is elastically deformed, when the plate-like portion is disposed in the case. In addition, the plate-like portion is provided with a rib that extends from one end portion of the plate-like portion to the other end portion of the plate-like portion in the door width direction.

With this arrangement, force generated from both end portions in the door width direction of the plate-like portion is transferred to the center portion in the door width direction of the plate-like portion via the rib, so that it can prevent deformation at the center portion and vicinity of the plate-like portion in the direction away from a seal surface on the case side. In this way, the center portion in the door width direction of the plate-like portion is elastically bent and deformed in the same manner as both end portions in the door width direction of the plate-like portion supported at three points, so that the center portion and vicinity of the plate-like portion can be pressed against the seal surface on the case side to suppress vibration of the center portion in the door width direction of the plate-like portion.

DESCRIPTION OF EMBODIMENTS

In the following, preferred embodiments of the present disclosure will be described with reference to the accompanying drawings. The same or equivalent parts in the embodiments below are indicated by the same reference characters throughout the figures.

(First Embodiment)

Figure 1:
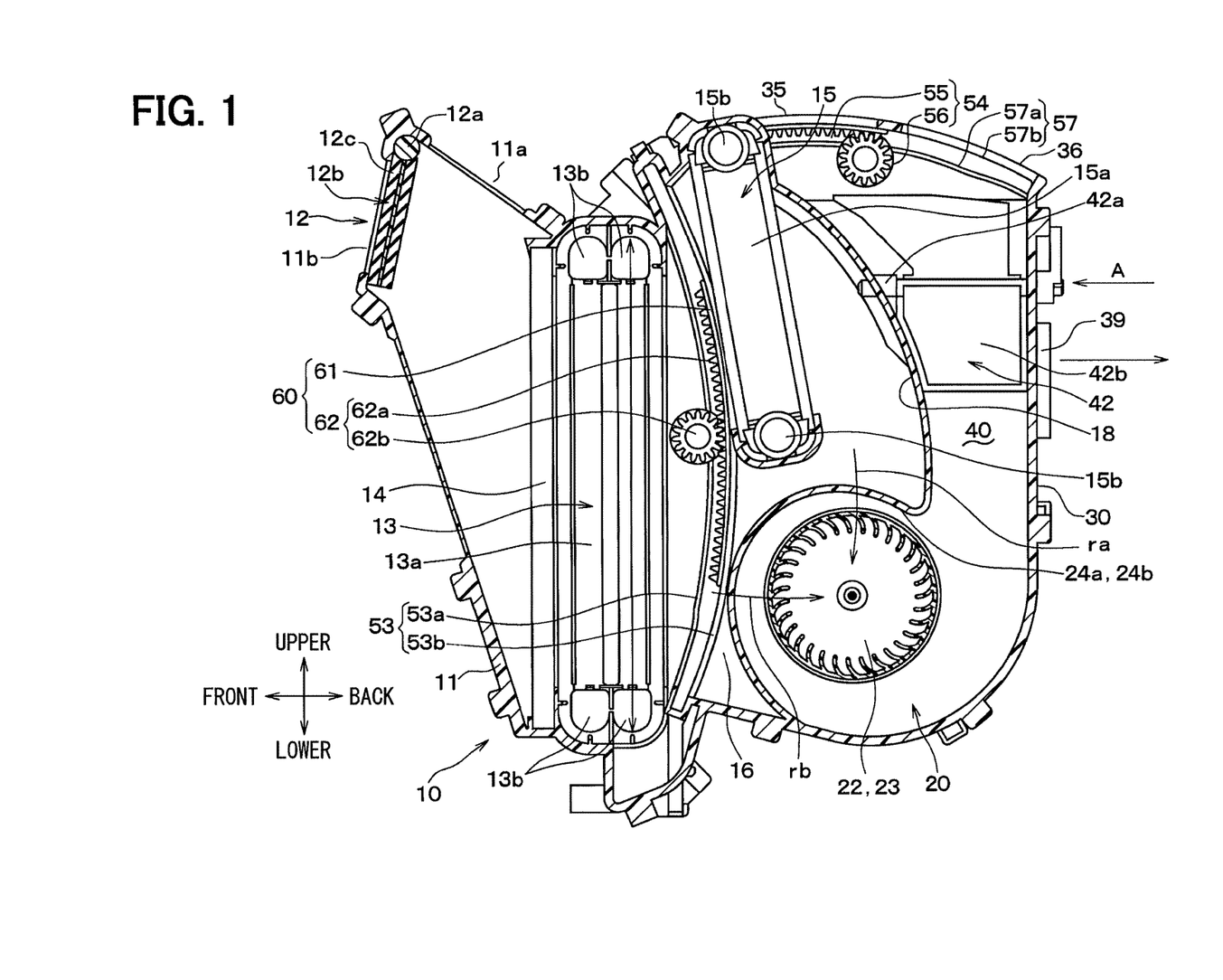
FIG. 1 is a cross-sectional side view of an interior air conditioning unit in an air conditioner for a vehicle using an air passage opening/closing device according to a first embodiment of the present disclosure.
Figure 2:
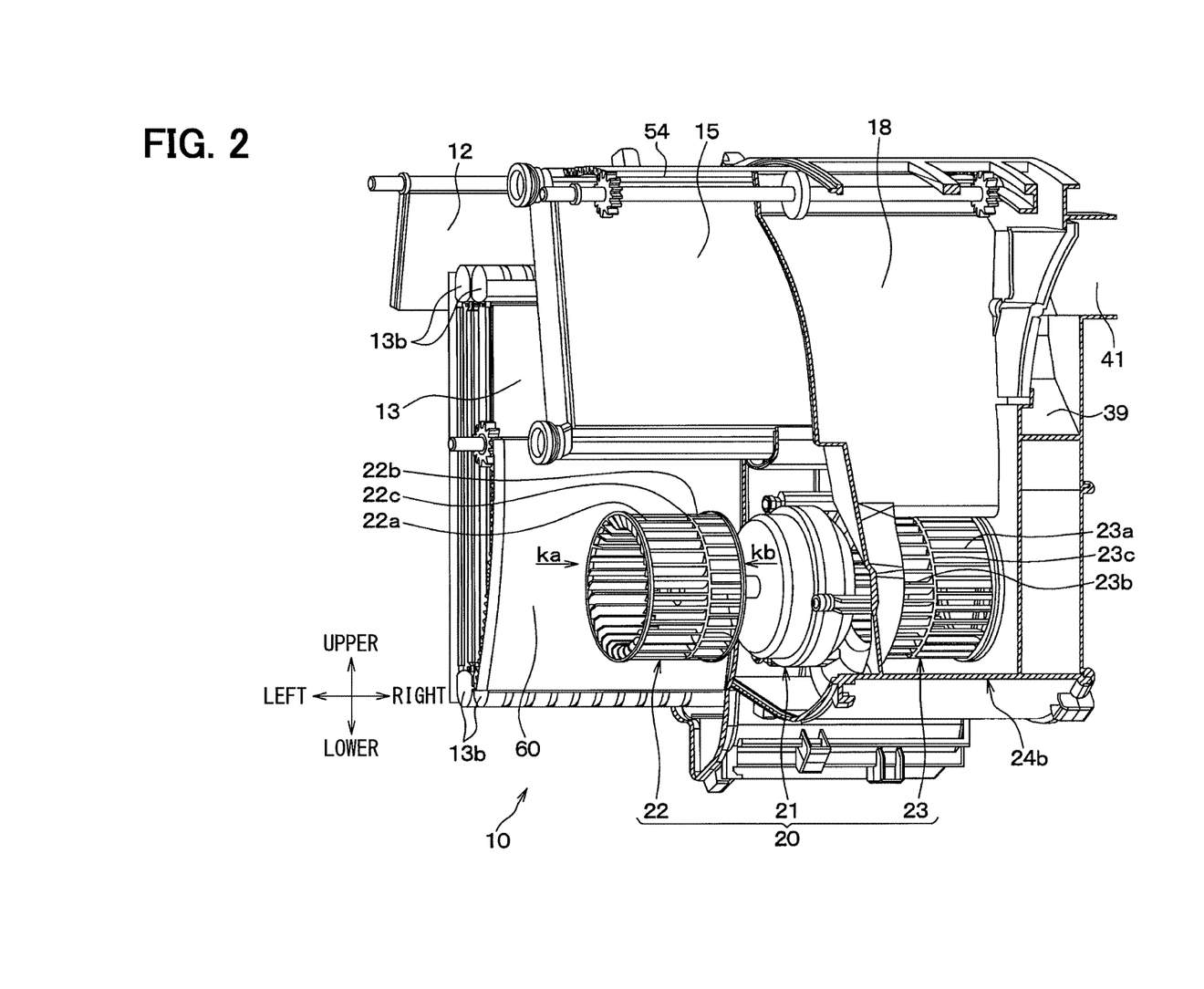
FIG. 2 is a partial cross-sectional view of the interior air conditioning unit as viewed in the direction of the arrow A of FIG. 1.

A first embodiment of the present disclosure will be described below. In this embodiment, an air passage opening/closing device of the present disclosure is applied to a vehicle air conditioner. Referring to FIGS. 1 and 2, the upper, lower, front, back, left, and right arrows indicate respective directions of the air passage opening/closing device in a vehicle-mounted state.

An interior air conditioning unit 10 is disposed in a substantially center area of the vehicle in left and right directions (in a door width direction of the vehicle) inside a dashboard (instrument panel) located at the forefront part of the vehicle interior. The interior air conditioning unit 10 forms an outer shell therefor, and includes an air conditioning case 11 for forming an air passage of air for an interior to be blown into the vehicle interior. The air conditioning case 11 is formed of resin (for example, polypropylene) having some degree of elasticity, and excellent strength.

The air conditioning case 11 has a division surface formed at the substantially center portion in the left-right direction of the vehicle, and extending in the up-down direction of the vehicle. The division surface can divide the interior of the air conditioning case 11 into two left and right portions. The two left and right division portions are integrally coupled together by a connection means, such as a metal spring, a clip, or a screw, while accommodating therein respective components including an air filter 14, an evaporator 13, a heater core 15 as will be described later.

As shown in FIG. 1, an inside/outside air switch 12 for switching between inside air (air in the vehicle interior) and outside air (air outside a vehicle compartment) to introduce the switched air into the air conditioning case is provided in the most upstream portion of the air passage formed in the air conditioning case 11 and on the vehicle front side and the upper side of the air conditioning case 11. The inside/outside air switch 12 has an inside air introduction port 11a for introducing inside air into the air conditioning case 11, and an outside air introduction port 11b for introducing outside air into the air conditioning case 11.

An inside/outside air switching door 12b is rotatably positioned inside the inside/outside air switch 12 to open and close the inside air introduction port 11a and the outside air introduction port 11b. Specifically, the inside/outside air switching door 12b is a so-called cantilever door which includes a plate-like door main portion 12c, and a rotary shaft 12a integrally coupled to one end portion of the main portion 12c and extending in the left-right direction of the vehicle.

The inside/outside air switching door 12 is adapted to rotate the rotary shaft 12a by a servo motor (not shown) to displace the door main portion 12c by the rotation to thereby continuously enable adjustment of the opening areas of the inside air introduction port 11a and the outside air introduction port 11b. The evaporator 13 is disposed on the downstream side of an air flow of the inside/outside air switch 12.

The evaporator 13 is one of the components included in the well-known evaporation compression refrigeration cycle (not shown). The evaporator 13 is a heat exchanger for cooling that cools the air to be blown into the interior by evaporating the low-pressure refrigerant in the refrigeration cycle to exhibit a heat absorption effect.

The evaporator 13 includes a core 13a composed of a plurality of tubes and a heat exchanging fin, and tanks 13b disposed on both ends of the core 13a to constitute a flat shape as a whole. The evaporator 13 has flattened surfaces (flat surfaces) thereof disposed in parallel with the vertical or up-down direction of the vehicle.

The tubes are arranged in parallel with the up-down direction and adapted to allow the refrigerant to flow therethrough. The heat exchanging fin promotes heat exchange between air and refrigerant in the tubes. The tanks 13b are respectively disposed on the upper and lower sides of the tubes, and adapted to distribute the refrigerant to the tubes and to collect the refrigerants from the tubes. Both the upper and lower tanks 13b and 13b are supported by the air conditioning case 11.

The thin, plate-like air filter 14 is disposed on the air upstream side of the evaporator 13 inside the air conditioning case 11. The air filter 14 is adapted to remove dust and the like from the air flowing into the evaporator 13.

A heater core 15 is disposed on the rear and upper sides of the vehicle positioned on the downstream side of the air flow of the evaporator 13. The heater core 15 is a heat exchanger for heating that exchanges heat between the air cooled by the evaporator 13 and a high-temperature engine coolant having circulating through an engine coolant circuit (not shown) and flowing into the core to thereby re-heating the cooled air.

Like the evaporator 13, the heater core 15 includes a core 15a composed of a plurality of tubes and a heat exchanging fin, and tanks 15b disposed on both ends of the core 15a to constitute a flat shape as a whole. The heater core 15 is disposed in substantially parallel with the evaporator 13. In this embodiment, the heater core 15 is disposed such that the upper end portion of the heater core 15 is positioned slightly close to the front side with respect to the lower end portion thereof with a flat surface of the heater core 15 inclined respective to a flat surface of the evaporator 13 by a predetermined angle (of less than about 30 degrees).

The tubes are disposed substantially in the up-down direction along the inclination angle of the heater core 15. The upper tank 15b distributes the refrigerant to the tubes 13a. The lower tank 15b collects the refrigerants from the tubes 13a. Both the upper and lower tanks 15b and 15b are respectively supported by the air conditioning case 11.

Then, a bypass passage 16 is formed behind the evaporator 13 and under the heater core 15. The bypass passage 16 is a passage for allowing the flow of the cooled air having passed through the evaporator 13 to bypass the heater core 15.

Directly after the evaporator 13, an air mix door 60 is disposed for adjusting the ratio of the volume of the cooled air flowing into the heater core 15 to that of the cooled air flowing into the bypass passage 16. The air mix door 60 is constructed of a slide door which includes a plate-like portion 61 extending curved in an arc shape in the up-down direction of the vehicle, a gear mechanism 62 for driving and displacing the plate-like portion 61 in the curved direction, and a rib 63 extending from one end in the door width direction of the plate-like portion 61 to the other end thereof, and having a rigidity higher than the plate-like portion 61 (see FIG. 3 to be described in detail later).

The plate-like portion 61 of the air mix door 60 is moved (slided) in the upward direction of the vehicle, thereby increasing an opening degree of the passage on the bypass passage 16 side, while decreasing an opening degree of the passage on the heater core 15 side. In contrast, the plate-like portion 61 of the air mix door 60 is moved (slided) in the downward direction of the vehicle, thereby decreasing an opening degree of the passage on the bypass passage 16 side, while increasing an opening degree of the passage on the heater core 15 side.

Such adjustment of the opening degree of the air mix door 60 adjusts the ratio of the volume of the cooled air sucked into a blower 20 to that of the warmed air sucked thereinto, and thereby it can control the temperature of the air for the interior to be blown into the vehicle interior. That is, the air mix door 60 constitutes temperature adjustment means for the interior air.

Figure 3:
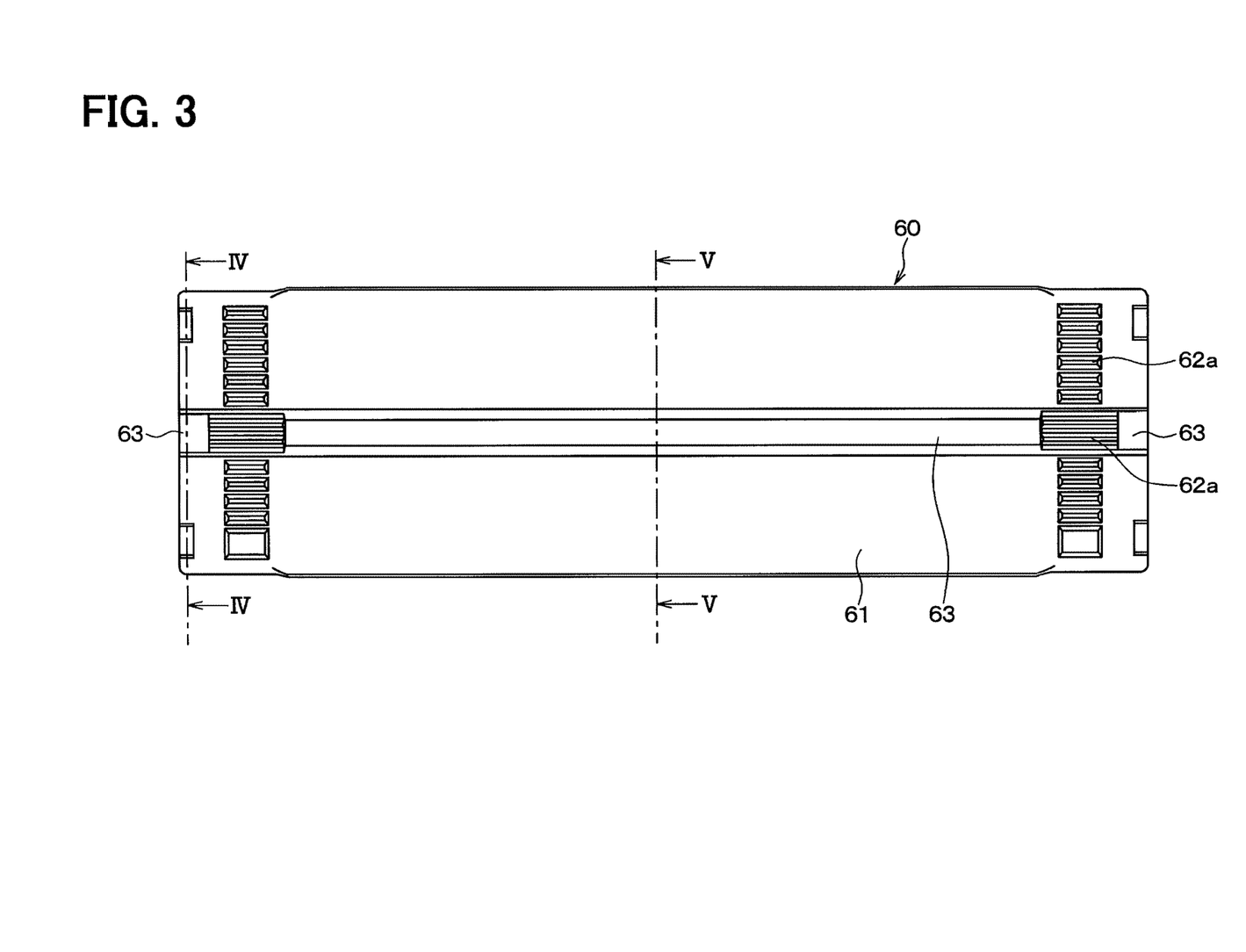
FIG. 3 is a front view of an air mix door of FIG. 1.

The gear mechanism 62 includes racks 62a provided in the plate-like portion 61 to extend in the door movement direction, and pinions 62b engaged with the racks 62a. The pinion 62b is driven by a servo motor (not shown). In this embodiment, the rack 62a and the pinion 62b are disposed on the windward side of the plate-like portion 61.

The racks 62a and pinions 62b are disposed near both end portions in the door width direction of the plate-like portion 61. Specifically, the racks 62a and pinions 62b are disposed on the slightly inner side with respect to both end portions in the door width direction of the plate-like portion 61.

Figure 4:
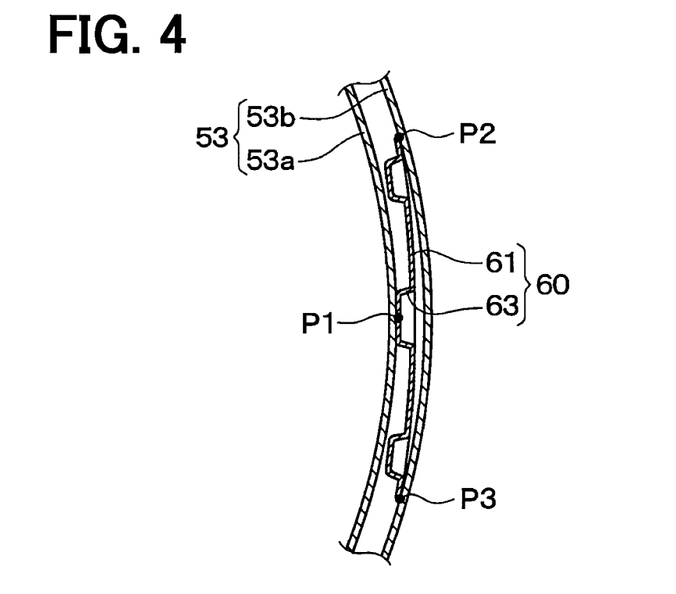
FIG. 4 is a cross-sectional view taken along the line IV-IV of the air mix door of FIG. 3.

The air conditioning case 11 is provided with guide grooves 53 for guiding the movement of the plate-like portion 61. The guide grooves 53 are disposed on both sides of the plate-like portion 61 in the door width direction. Each guide groove 53 includes a windward sidewall portion 53a extending in the door movement direction on the windward side with respect to the plate-like portion 61, and a leeward sidewall portion 53b positioned on the leeward side with respect to the plate-like portion 61 and opposed to the windward sidewall portion 53a.

Both end portions in the door width direction of the plate-like portion 61, that is, parts of the plate-like portion 61 outside the respective rack 62a in the door width direction can be slidably inserted into between the windward sidewall portion 53a and the leeward sidewall portion 53b. In this way, the movement of the plate-like portion 61 is guided by the guide grooves 53 each having the windward sidewall portion 53a and the leeward sidewall portion 53b.

The blower 20 is disposed below the heater core 15 inside the air conditioning case 11. As shown in FIGS. 1 and 2, the blower 20 includes an electric motor 21, impellers 22 and 23, and scroll cases 24a and 24b. The electric motor 21 is disposed at the center portion in the left-right direction of the vehicle within the air conditioning case 11. The rotary shaft of the electric motor 21 respectively extends toward both sides in the left-right direction of the vehicle.

The impellers 22 and 23 are a centrifugal multiblade fan. The impeller 22 is fixed to the left tip end of the rotary shaft of the electric motor 21. The impeller 22 includes a fan portion 22a with a number of blades arranged around the rotary shaft and which is adapted to suck air thereinto from the left side in the axial direction and to blow the air out toward the outside in the radial direction as indicated by the arrow Ka of FIG. 2. The impeller 22 also includes a fan portion 22b with a number of blades arranged around the rotary shaft, and which is adapted to suck air thereinto from the right side in the axial direction and to blow the air out toward the outside in the radial direction as indicated by the arrow Kb of FIG. 2. The impeller 22 further includes a partition wall 22c for partitioning the inside of the impeller into the fan portions 22a and 22b. With this arrangement, the impeller 22 can suck the air from both sides in the rotary shaft direction to blow the air out toward the outside in the radial direction.

The impeller 23 is fixed to the right tip end portion of the rotary shaft of the electric motor 21. Like the impeller 22, the impeller 23 includes a fan portion 23a with a number of blades arranged around the rotary shaft and which is adapted to suck air thereinto from the left side in the axial direction and to blow the air out toward the outside in the radial direction. The impeller 23 also includes a fan portion 23b with a number of blades arranged around the rotary shaft and which is adapted to suck air thereinto from the right side in the axial direction and to blow the air out toward the outside in the radial direction. The impeller 23 further includes a partition wall 23c for partitioning the inside of the impeller into the fan portions 23a and 23b. With this arrangement, the impeller 23 can suck the air from both sides in the rotary shaft direction to blow the air out toward the outside in the radial direction.

The scroll case 24a individually accommodates therein the fan portions 22a and 22b of the impeller 22, and forms an outflow air passage for allowing the air having flowed from the fan portions 22a and 22b to flow therethrough. The scroll case 24a is formed in a spiral pattern that gradually enlarges a sectional area of the outflow air passage in the rotational direction of the impeller 22. The scroll case 24a includes two suction ports respectively provided on both sides thereof in the rotary shaft direction, and an air outlet for blowing upward the air fed from the impeller 22.

The scroll case 24b individually accommodates therein the fan portions 23a and 23b of the impeller 22, and forms an outflow air passage for allowing the air having flowed from the fan portions 23a and 23b to flow therethrough. The scroll case 24b is formed in a spiral pattern that gradually enlarges a sectional area of the outflow air passage in the rotational direction of the impeller 23. The scroll case 24b includes two suction ports respectively provided on both sides thereof in the rotary shaft direction, and an air outlet for blowing upward the air fed from the impeller 23.

As shown in FIG. 1, a partition wall 18 is formed in a curved shape on the vehicle rear side of the heater core 15 inside the air conditioning case 11. The partition wall 18 serves as a guide wall that guides the warm air blown from the heater core 15 toward the blower 20 side.

Inside the air conditioning case 11, an air passage 40 is provided between the partition wall 18 and the rear wall (outer wall) 30 to guide the air blown from the scroll cases 24a and 24b to air outlets 35 and 36. The air outlet 36 is provided in a vehicle rear part of the upper surface of the air conditioning case 11. The air outlet 36 is a face opening for blowing the air flow having passed through an air passage 40 toward the upper body of the passenger.

The air outlet 35 is provided on a vehicle front side of the upper surface of the air conditioning case 11 with respect to the air outlet 36. The air outlet 35 is a defroster opening for blowing the air flow having passed through the air passage 40 toward an inner surface of a front glass of the vehicle. An air-outlet mode door 54 is disposed on the inner side of the air outlets 35 and 36 of the air conditioning case 11. The air outlets 35 and 36 are disposed on the upper side in the vertical direction with respect to the blower 20.

The air-outlet mode door 54 is the same type of slide door as the air mix door 60. The air-outlet mode door 54 includes a plate-like portion 55 extending curved in an arc shape toward the rear side of the vehicle, and a gear mechanism 56 for driving and displacing the plate-like portion 55 in the curved direction.

The plate-like portion 55 of the air outlet mode door 54 is moved (slided) toward the front side of the vehicle, thereby increasing an opening degree of the passage on the air outlet 36 side, while decreasing an opening degree of the passage on the air outlet 35 side. Conversely, the plate-like portion 55 is moved (slided) toward the rear side of the vehicle, thereby increasing an opening degree of the passage on the air outlet 35 side, while decreasing an opening degree of the passage on the air outlet 36 side.

The gear mechanism 56 of the air-outlet mode door 54 includes racks and pinions, like the gear mechanism 62 of the air mix door 60. A guide groove 57 for guiding the movement of the plate-like portion 55 of the air-outlet mode door 54 includes a windward sidewall portion 57a positioned on the windward side of the plate-like portion 55 and a leeward sidewall portion 57b positioned on the leeward side of the plate-like portion 55, like the guide groove 53 of the air mix door 60.

As shown in FIG. 1, the rear wall 30 of the air conditioning case 11 is provided with a rear-seat side foot opening 39. The rear-seat side foot opening 39 allows the air flow having passed through the air passage 40 to blow toward a passenger's foot on the rear seat. As shown in FIG. 2, the air conditioning case 11 is provided with a front seat side foot opening 41. The front seat side foot opening 41 allows the air flow having passed through the air passage 40 to blow toward a passenger's foot on the front seat. The foot openings 39 and 41 are disposed on the upper side in the vertical direction with respect to the blower 20.

A foot door 42 is disposed inside the foot openings 39 and 41 in the air conditioning case 11. The foot door 42 is a so-called butterfly door which includes a plate-like door main portion 42b, and a rotary shaft 42a integrally coupled to the substantially center portion of the door main portion 42b and extending in the front-back direction of the vehicle. The rotary shaft 42a is rotated by a servo motor (not shown) to rotate and displace the door main portion 42b, thereby opening and closing the foot openings 39 and 41.

Next, the operation of the interior unit 10 of this embodiment will be described. First, the electric motor 21 of the blower 20 rotatably drives the respective impellers 22 and 23. Then, the impeller 22 sucks the air from both suction ports of the scroll case 24a to blow out the air from the air outlet of the scroll case 24a.

Then, the impeller 23 sucks the air from both suction ports of the scroll case 24b to blow out the air from the air outlet of the scroll case 24b. Such an operation of the blower 20 introduces air into the air conditioning case 11 via at least one of the inside air introduction port 11a and the outside air introduction port 11b.

The air introduced from one introduction port flows into the evaporator 13 through the air filter 14. When passing through the evaporator 13, the air exchanges heat with the refrigerant to be cooled so as to become a cooled air.

While the air mix door 60 respectively opens the air inlet of the bypass passage 16 and the air inlet of the heater core 15, a part of cooled air blown from the evaporator 13 flows into the heater core 15 side to be heated by the heater core 15. In this way, the warm air is blown out of the heater core 15.

The warm air is guided by the partition wall 18 toward the blower 20 side to flow as indicated by the arrow ra of FIG. 1. The remaining part of the cooled air blown from the evaporator 13 passes through the bypass passage 16 to flow as indicated by the arrow rb of FIG. 1.

Together with this, the cooled air passing through the bypass passage 16 and the warm air blown from the heater core 15 flow toward both suction ports of the scroll case 24a. The cooled air and the warm air collide with each other at an angle of about 90 degrees before being sucked into the suction ports. The cooled air passing through the bypass passage 16 and the warm air blown from the heater core 15 also flow toward both suction ports of the scroll case 24*b*. The cooled air and the warm air collide with each other at an angle of about 90 degrees before being sucked into the suction ports.

In this way, the cooled air and warm air colliding with each other before being sucked into the scroll cases 24*a* and 24*b* in this way are sucked thereinto by the operations of the impellers 22 and 23 to be blown out in the radial direction. Thus, the mixture of the colliding cooled air and warm air is blown out as a conditioned air in the radial direction.

Thereafter, the conditioned air is blown out to the air passage 40 through the scroll cases 24*a* and 24*b*. The blown conditioned air passes through the air passage 40 and then are blown to the vehicle interior via any one of the air outlets 36 and 37 and the foot openings 39 and 41.

Figure 5:
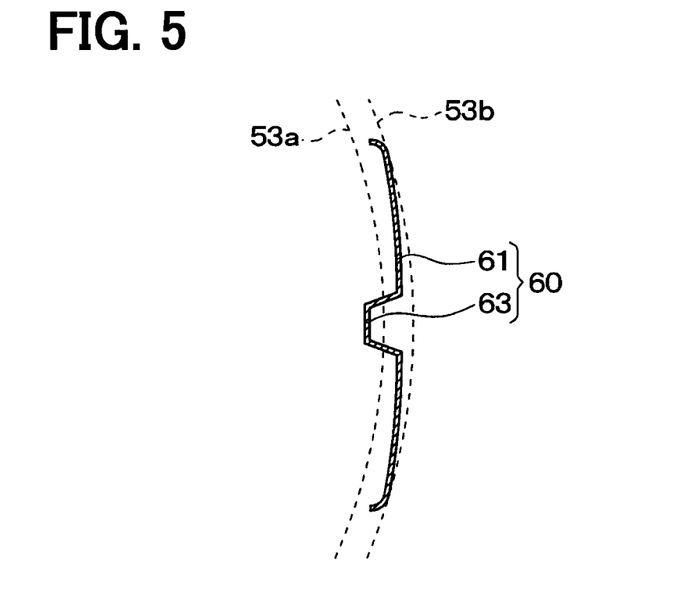
FIG. 5 is a cross-sectional view taken along the line V-V of the air mix door of FIG. 3.

Now, the characteristic structure, operations, and effects of this embodiment will be described with reference to FIGS. 3 to 5. FIG. 3 is a front view of an air mix door 60 of FIG. 1 as seen from the windward side. FIG. 4 is a cross-sectional view taken along the line IV-IV of FIG. 3, while showing the shape of the air mix door 60 assembled to the guide grooves 53 (stuck in the guide grooves 53). FIG. 5 is a cross-sectional view taken along the line V-V of FIG. 3, while showing the shape of the air mix door 60 assembled to the guide grooves 53 (stuck in the guide grooves 53).

In the air mix door 60 of this embodiment, the radius of curvature of the plate-like portion 61 in a state before being assembled to the guide groove 53 (that is, in a single non-mounted state) is set more than the radius of curvature of each of the windward sidewall portion 53*a* and the leeward sidewall portion 53*b* of the guide groove 53.

As shown in FIGS. 3 to 5, the one rib 63 extends from one end to the other end of the plate-like portion 61 in the door width direction (in the left-right direction of the page of FIG. 3), and is disposed at the center portion of the plate-like portion 61 in the door movement direction (in the up-down direction of the page of FIG. 3). The rib 63 is integrally formed with the plate-like portion 61, and protrudes from the plate-like portion 61 toward the windward side, so that the rib 63 has a trapezoidal sectional shape. A part of the rack 62*a* located in the center portion of the plate-like portion in the door movement direction is formed at a part of the rib 63, and also serves as the rib 63.

As shown in FIG. 4, when assembling the air mix door 60 in the guide grooves 53, the plate-like portion 61 has both end portions thereof in the door width direction supported in the following manner. The rib 63 is abutted against the windward sidewall portion 53*a* at the abutment point P1, while both end portions of the plate-like portion 61 in the door movement direction are abutted against the leeward sidewall portions 53*b* at abutment points P2 and P3, so that the air mix door 60 is elastically and deformed.

An elastic restoring force that intends to return the plate-like portion 61 to a free state is generated at the respective abutment points P1 to P3. Thus, the elastic restoring force allows both end portions in the door width direction of the plate-like portion 61 to be pressed against the windward sidewall portion 53*a* and the leeward sidewall portion 53*b*.

In this way, the plate-like portion 61 has both end portions thereof in the door width direction, each being supported at three points. This arrangement can suppress abnormal sounds (beat noise) from occurring due to vibration of both end portions and vicinity of the plate-like portion 61 in the door width direction when the entire interior air conditioning unit 10 vibrates while the air pressure is not applied to the plate-like portion 61.

The force generated from both end portions in the door width direction of the plate-like portion 61 is transferred to the center portion of the plate-like portion 61 in the door width direction via the ribs 63, so that it prevents the center portion and vicinity of the plate-like portion 61 from being deformed in the direction away from the seal surface of the air conditioning case 11. As a result, as shown in FIG. 5, a center portion of the plate-like portion 61 in the door width direction is elastically bent and deformed, like both end portions in the door width direction of the plate-like portion 61 supported at three points, so that the center and vicinity of the plate-like portion 61 is pressed against the seal surface of the air conditioning case 11.

In this way, because the center and vicinity of the plate-like portion 61 is pressed against the seal surface of the air conditioning case 11, it can suppress the abnormal sounds (beat noise) from occurring due to vibration of the center and vicinity of the plate-like portion 61 when the entire interior air conditioning unit 10 vibrates when the air pressure is not applied to the plate-like portion 61.

(Second Embodiment)

A second embodiment of the present disclosure will be described below.

This embodiment differs from the first embodiment in structure of the air mix door 60. In other points, this embodiment is the same as the first embodiment, and thus only different parts of this embodiment will be described below.

Figure 6:
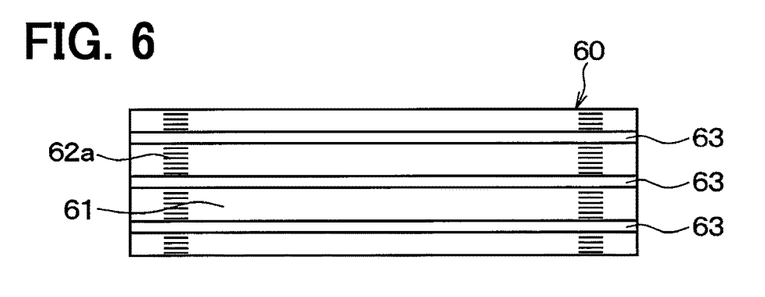
FIG. 6 is an exemplary front view of an air mix door in an air passage opening/closing device according to a second embodiment of the present disclosure.

As shown in FIG. 6, the air mix door 60 of this embodiment includes a plurality of ribs 63 spaced apart from each other in the door movement direction. Specifically, the ribs 63 are disposed at the center portion of the plate-like portion in the door movement direction and in the vicinity of both end portions thereof in the door movement direction.

With this arrangement, the force generated from both end portions of the plate-like portion 61 in the door movement direction is also transferred via the ribs 63 to the vicinity of both end portions of the plate-like portion 61 in the door movement direction and the center portion of the plate-like portion 61 in the door width direction. As a result, the center and vicinity of the plate-like portion 61 can be ensured to be pressed against the seal surface of the air conditioning case 11, surely suppressing the abnormal sound (beat noise) from occurring due to vibration of the center and vicinity of the plate-like portion 61.

(Third Embodiment)

A third embodiment of the present disclosure will be described below.

This embodiment differs from the first embodiment in structure of the air mix door 60. In other points, this embodiment is the same as the first embodiment, and thus only different parts of this embodiment will be described below.

Figure 7:
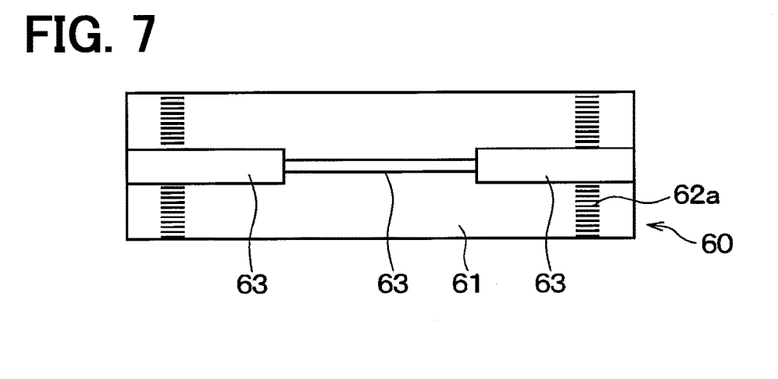
FIG. 7 is an exemplary front view of an air mix door in an air passage opening/closing device according to a third embodiment of the present disclosure.

As shown in FIG. 7, the air mix door 60 of this embodiment includes a rib 63 whose size changes depending on the position in the door width direction. Specifically, both end parts of the rib 63 in the door width direction are larger than the center portion of the rib 63 in the door width direction.

This embodiment can be combined with the respective embodiments described above.

(Other Embodiments)

Although the rib 63 has a trapezoidal sectional shape in the respective above-mentioned embodiments, the rib 63 may have any other sectional shape (for example, rectangular).

In the first embodiment, the center (P1) of the plate-like portion 61 in the door movement direction is abutted against the windward sidewall portion 53a, and the end portions (P2, P3) in the door movement direction of the plate-like portion 61 are abutted against the leeward sidewall portion 53b, thereby causing the plate-like portion 61 to be elastically deformed.

However, the center (P1) of the plate-like portion 61 in the door movement direction may be abutted against the leeward sidewall portion 53b, and the end portions (P2, P3) in the door movement direction of the plate-like portion 61 may be abutted against the leeward sidewall portion 53a, thereby causing the plate-like portion 61 to be elastically deformed.

What is claimed is:

1. An air passage opening/closing device comprising:
   a case forming an air passage;
   a slide door including a plate portion slidably disposed in the case, the slide door being adapted to open and close the air passage by the plate portion;
   a guide groove including a windward sidewall portion formed in the case to extend in a door movement direction on a windward side with respect to the plate portion, and a leeward sidewall portion formed in the case to be opposed to the windward sidewall portion on a leeward side with respect to the plate portion, the guide groove guiding a movement of the plate portion by the windward sidewall portion and the leeward sidewall portion; and
   a gear mechanism configured to actuate the plate portion, wherein
   the guide groove is disposed at both sides of the plate portion in a door width direction,
   a radius of curvature of the plate portion in a single non-mounted state is set more than a radius of curvature of each of the windward sidewall portion and the leeward sidewall portion,
   a center portion in the door movement direction of the plate portion is abutted against one of the windward sidewall portion and the leeward sidewall portion, and an end portion in the door movement direction of the plate portion is abutted against the other one of the windward sidewall portion and the leeward sidewall portion, such that the plate portion is elastically deformed and is supported by the guide groove at three points, when the plate portion is disposed in the case,
   the plate portion is provided with a rib extending from one end portion of the plate portion to the other end portion of the plate portion in the door width direction, and protruding from a surface of the plate portion toward a windward side so as to abut the windward sidewall portion of the guide groove at the center portion,
   the gear mechanism includes
      a plurality of rack segments, at least one rack segment being disposed on each side of the plate portion in the door width direction, each of the plurality of rack segments extending along the door movement direction, and
      a plurality of pinions, each pinion meshed with a corresponding rack segment,
   the rib includes
      a plurality of rack portions, each of which intersects with a corresponding one of the plurality of rack segments to function as both part of the rib and part of the corresponding one of the plurality of rack segments, and
      an interposed portion which extends between the plurality of rack portions,
   a height of the rack portions is smaller than a space between the windward sidewall portion and the leeward sidewall portion,
   a height of the interposed portion is greater than the space between the windward sidewall portion and the leeward sidewall portion, and
   the rack portions are wider than the rack in both sides of the door width direction.

2. The air passage opening/closing device according to claim 1, wherein
   the rib is a single rib disposed at a center portion in the door movement direction of the plate portion.

3. The air passage opening/closing device according to claim 1, wherein
   a plurality of the ribs are disposed at positions spaced apart from each other in the door movement direction of the plate portion.

4. The air passage opening/closing device according to claim 1, wherein
   the rib is integrally formed with the plate portion.

5. The air passage opening/closing device according to claim 1, wherein
   the rib has a higher rigidity than the plate portion.

6. The air passage opening/closing device according to claim 1, wherein
   the center portion in the door movement direction of the plate portion is abutted against the windward sidewall portion, and the end portion in the door movement direction of the plate portion is abutted against the leeward sidewall portion, such that the plate portion is elastically deformed.

7. The air passage opening/closing device according to claim 1, wherein the plate portion is urged against each of the three points by the elastic deformation of the plate portion.

8. The air passage opening/closing device according to claim 1, wherein the rib protrudes from the plate portion and has a trapezoidal sectional shape.

9. An air passage opening/closing device comprising:
   a case forming an air passage;
   a slide door including a plate portion slidably disposed in the case, the slide door being adapted to open and close the air passage by the plate portion;
   a guide groove including a windward sidewall portion formed in the case to extend in a door movement direction on a windward side with respect to the plate portion, and a leeward sidewall portion formed in the case to be opposed to the windward sidewall portion on a leeward side with respect to the plate portion, the guide groove guiding a movement of the plate portion by the windward sidewall portion and the leeward sidewall portion; and
   a gear mechanism configured to actuate the plate portion, wherein
   the guide groove is disposed on both sides of the plate portion in a door width direction,
   a radius of curvature of the plate portion in a single non-mounted state is set more than a radius of curvature of each of the windward sidewall portion and the leeward sidewall portion,
   a center portion in the door movement direction of the plate portion is abutted against the windward sidewall portion, and both end portions in the door movement direction of the plate portion are abutted against the leeward sidewall portion, such that the plate portion is elastically deformed and is supported by the guide groove at three points, when the plate portion is disposed in the case, the plate portion is provided with a rib extending from one end portion of the plate portion to the other end portion of the plate portion in the door width direction, and protruding from a surface of the plate portion toward a windward side so as to abut the windward sidewall portion of the guide groove at the center portion, the gear mechanism includes
- a plurality of rack segments, at least one rack segment being disposed on each side of the plate portion in the door width direction, each of the plurality of rack segments extending along the door movement direction, and
- a plurality of pinions, each pinion meshed with a corresponding rack segment, the rib includes
- a plurality of rack portions, each of which intersects with a corresponding one of the plurality of rack segments to function as both part of the rib and part of the corresponding one of the plurality of rack segments, and
- an interposed portion which extends between the plurality of rack portions, a height of the rack portions is smaller than a space between the windward sidewall portion and the leeward sidewall portion, a height of the interposed portion is greater than the space between the windward sidewall portion and the leeward sidewall portion, and the rack portions are wider than the rack in both sides of the door width direction.

10. The air passage opening/closing device according to claim 9, wherein the plate portion is urged against each of the three points by the elastic deformation of the plate portion.

11. The air passage opening/closing device according to claim 9, wherein the rib protrudes from the plate portion and has a trapezoidal sectional shape.

* * * * *